April 2, 1963 S. J. JENNINGS 3,083,413
ROTARY FEED FOR COTTON GIN
Filed Sept. 19, 1960

INVENTOR.
SAMUEL J. JENNINGS.
BY
Willard S. Grome
ATTORNEY.

United States Patent Office 3,083,413
Patented Apr. 2, 1963

3,083,413
ROTARY FEED FOR COTTON GIN
Samuel J. Jennings, Phoenix, Ariz., assignor to Community Gin Company, Glendale, Ariz., a corporation of Arizona
Filed Sept. 19, 1960, Ser. No. 56,717
3 Claims. (Cl. 19—52)

This invention pertains to cotton gins and is particularly directed to a rotary feed mechanism for a cotton gin.

An object of this invention is to provide a rotary feed mechanism for a cotton gin which is adapted to continuously feed seed cotton to the exposure gap of a cotton gin.

Still another object of this invention is to provide a novel feed apparatus for a rotary cotton gin wherein a continuous cylindrical roll of seed cotton is slowly rotated in the exposure gap of a rotary cotton gin.

A further object is to provide a rotary cotton gin with a feed hopper depositing seed cotton in a cylindrical feed chamber in which slowly rotates a wiper bar to continuously present seed cotton to the exposure gap of the rotary gin and to wipe freed seeds over a seed discharge grate associated with the bottom of said cylindrical feed chamber.

Further features and advantages of this invention will appear from a detailed description of the drawings in which.

Figure 1:
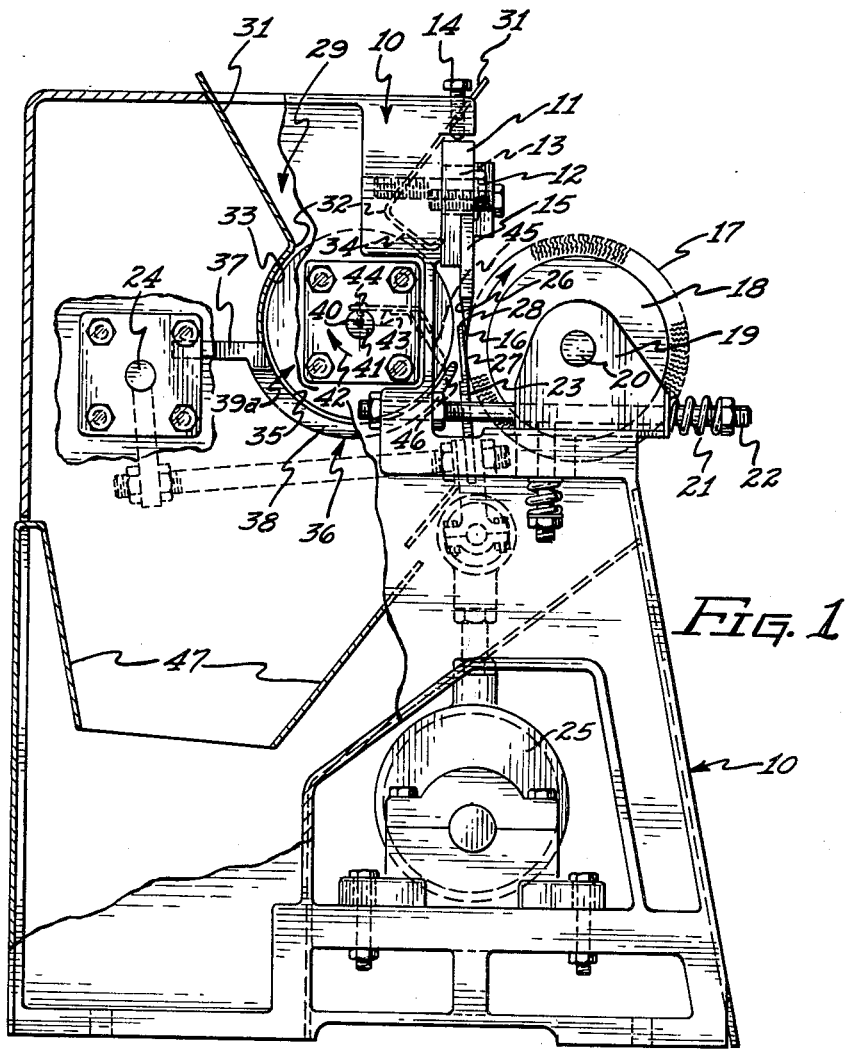
FIG. 1 is a diagrammatic view through a rotary cotton gin incorporating the features of this invention.
Figures 2, 3:
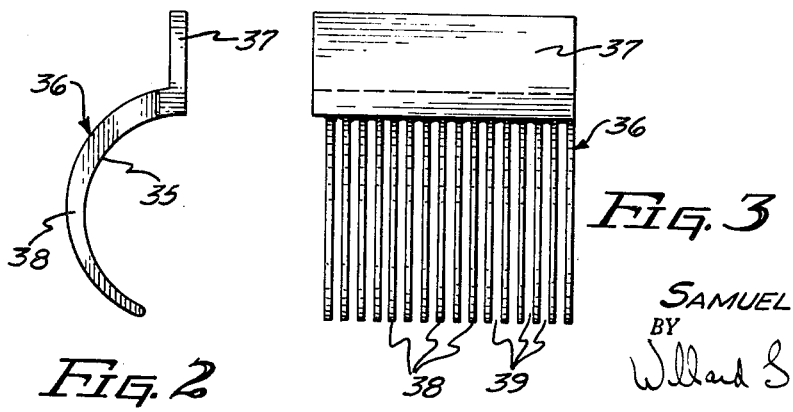
FIG. 2 is an end elevational view of the seed grate associated with the rotary feed mechanism of this invention.
FIG. 3 is a plan view of the same.

As an example of one embodiment of this invention there is shown a ginning machine having a frame 10 upon which is mounted the breastplate 11 by suitable bolts 12 passing through elongated slots 13 in the breastplate 11 to provide relative vertical adjustment by the set screws 14. A suitable rigid scraper blade 15, such as shown in Patent 2,903,750 issued Sept. 15, 1959, may preferably be utilized and having a cutting edge 16 in engagement with the periphery 17 of the usual gin roll 18.

The gin roll 18 is journaled in suitable pillow blocks 19 on the gin roll shaft 20 which is rotated at proper ginning speed by the usual drive apparatus (not shown). The pillow blocks and gin roll are yieldingly urged toward the scraper blade 15 by the compression springs 21 carried on the studs 22 fixed to the frame 10.

The usual vertically reciprocating stripper knife 23 is suitably supported by the usual pivot 24 and eccentric 25 on the frame 10 so as to maintain a proper clearance between the rear surface 26 of the scraper blade 15 and the front surface 27 of the stripper knife 23.

The exposure gap provided between the cutting edge 16 of the scraper blade 15 and the upper end 28 of the stripper knife (when in lower retracted position) is fed continuously with seed cotton from a supply hopper 29 having the sloping sides 31 terminating at their lower ends to form a discharge opening 32. This opening is located in the top portion of a substantially cylindrical horizontally disposed feed chamber defined by the surfaces 33 and 34 of the lower portion of the hopper 29 and the upwardly facing semi-cylindrical surface 35 of the seed grate member 36. The seed grate has a shank portion 37 suitably fixed to the frame 10 and has a series of curved fingers 38 separated by the slots 39 extending under and forming the bottom half of the cylindrical feed chamber 39a.

Centrally located within the cylindrical feed chamber 39a to rotate about the axis 40 is the feed shaft 41 which is rotated by suitable drive mechanism (not shown) at a relatively slow feeding speed, slower than the speed of rotation of the gin roll, in the same direction as the gin roll as indicated by the arrow 42. Fixed to the feed shaft 41 are one or more pickup and agitator elements each comprising an arm 43 fixed at its inner end by a screw 44 to the shaft 41 and having a wiper element 45 attached to its outer end, the outer end 46 sweeping around over the discharge opening 32 to pick up new seed cotton and sweep it into the exposure gap and then to sweep away the separated seeds from the stripper knife 23 and discharge them out through the slots 39 of the seed grate member into the usual seed hopper 47. Thus, a continuous supply of seed cotton is fed to the gin roll exposure gap while the seeds separated from the cotton are continually discharged out through the seed grate 36 at a much more efficient rate than in former reciprocating apparatus used in the past for this purpose.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. A cotton gin comprising in combination:
   a. a frame,
   b. a scraper blade mounted on said frame,
   c. a gin roll journaled on said frame adapted to revolve in engagement with said scraper blade,
   d. a vertically reciprocating stripper knife on said frame,
   e. a seed cotton supply hopper on said frame,
   f. a cylindrical horizontally disposed feed chamber on said frame located below and receiving a supply of seed cotton from said hopper,
   g. an upwardly concave facing semi-cylindrical seed grate in the bottom of said feed chamber,
   h. a feed shaft journaled on said frame having its axis of rotation centrally positioned within said feed chamber adapted to revolve in the same direction as said gin roll,
   i. a pickup and agitator element fixed on said feed shaft having,
   j. a wiper element attached to the outer end of said pickup and agitator element adapted to sweep around within said feed chamber to present seed cotton from said hopper to said gin roll and to sweep away seed separated by said gin to said seed grate.

2. A cotton gin comprising in combination:
   a. a frame,
   b. a scraper blade mounted on said frame,
   c. a gin roll journaled on said frame adapted to revolve in engagement with said scraper blade,
   d. a vertically reciprocating stripper knife on said frame,
   e. a seed cotton supply hopper on said frame,
   f. a cylindrical horizontally disposed feed chamber on said frame located below and receiving a supply of seed cotton from said hopper,
   g. a semi-cylindrical seed grate on said frame forming the bottom portion of said feed chamber comprising,
   h. a series of curved fingers having slots therebetween extending circumferentially of said feed chamber,
   i. a feed shaft journaled on said frame within said feed chamber having its axis of rotation on the axis of said feed chamber adapted to revolve in the same direction as said gin roll,
   j. a pickup and agitator element fixed on said feed shaft having,
   k. a wiper element attached to the outer end of said pickup and agitator element and pitched in the direction of rotation of said feed shaft.

3. A cotton gin comprising in combination:
a. a frame,
b. a scraper blade mounted on said frame,
c. a gin roll journaled on said frame adapted to revolve in engagement with said scraper blade,
d. a vertically reciprocating stripper knife on said frame,
e. a seed cotton supply hopper on said frame,
f. a cylindrical horizontally disposed feed chamber on said frame located below and receiving a supply of seed cotton from said hopper,
g. a semi-cylindrical seed grate on said frame forming the bottom portion of said feed chamber comprising,
h. a series of curved fingers having slots therebetween extending circumferentially of said feed chamber,
i. a feed shaft journaled on said frame within said feed chamber having its axis of rotation on the axis of said feed chamber adapted to revolve in the same direction as said gin roll,
j. a pickup and agitator element fixed on said feed shaft having,
k. a wiper element attached to the outer end of said pickup and agitator element and pitched in the direction of rotation of said feed shaft,
l. the outer edge of said wiper element sweeping around within said feed chamber at a slower peripheral speed than the peripheral speed of said gin roll to present seed cotton from said hopper to said gin roll and to sweep away seed separated by said scraper blade and stripper knife to said seed grate for disposal of said seed out through said slots between said seed grate fingers.

References Cited in the file of this patent

UNITED STATES PATENTS

| | | |
|---|---|---|
| 655,168 | Prior | July 31, 1900 |
| 828,668 | Kent | Aug. 14, 1906 |
| 1,717,569 | Libert | June 18, 1929 |
| 2,903,750 | O'Neal | Sept. 15, 1959 |